(12) United States Patent
Sohn

(10) Patent No.: US 12,545,706 B2
(45) Date of Patent: *Feb. 10, 2026

(54) PHARMACEUTICAL COMPOSITION FOR PREVENTING OR TREATING BEHCET'S DISEASE AND RHEUMATOID ARTHRITIS, CONTAINING PEPTIDE OR MIXTURE THEREOF AS ACTIVE INGREDIENT

(71) Applicant: AJOU UNIVERSITY INDUSTRY-ACADEMIC COOPERATION FOUNDATION, Suwon-si (KR)

(72) Inventor: Seonghyang Sohn, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 920 days.

This patent is subject to a terminal disclaimer.

(21) Appl. No.: 17/782,336

(22) PCT Filed: Dec. 4, 2020

(86) PCT No.: PCT/KR2020/017627
§ 371 (c)(1),
(2) Date: Dec. 29, 2022

(87) PCT Pub. No.: WO2021/112614
PCT Pub. Date: Jun. 10, 2021

(65) Prior Publication Data
US 2023/0174579 A1 Jun. 8, 2023

(30) Foreign Application Priority Data

Dec. 5, 2019 (KR) .................. 10-2019-0160690
Dec. 5, 2019 (KR) .................. 10-2019-0160691
Nov. 26, 2020 (KR) .................. 10-2020-0160760

(51) Int. Cl.
| | | |
|---|---|---|
| C07K 7/08 | (2006.01) | |
| A61K 9/00 | (2006.01) | |
| A61K 9/02 | (2006.01) | |
| A61P 19/02 | (2006.01) | |

(52) U.S. Cl.
CPC .............. *C07K 7/08* (2013.01); *A61K 9/0019* (2013.01); *A61K 9/0056* (2013.01); *A61K 9/02* (2013.01); *A61P 19/02* (2018.01)

(58) Field of Classification Search
None
See application file for complete search history.

(56) References Cited

U.S. PATENT DOCUMENTS

| | | | | |
|---|---|---|---|---|
| 11,071,757 B2 | * | 7/2021 | Sohn | .................. A61P 1/04 |
| 11,319,344 B2 | * | 5/2022 | Tan | .................. C07K 7/08 |
| 12,188,096 B2 | * | 1/2025 | Yao | .................. C12Q 1/6886 |
| 2009/0209468 A1 | | 8/2009 | Reid et al. | |

FOREIGN PATENT DOCUMENTS

| | | | | |
|---|---|---|---|---|
| CN | 1849329 A | 10/2006 | | |
| CN | 101955524 A | 1/2011 | | |
| KR | 10-1802515 B1 | 11/2017 | | |
| KR | 10-2019-0102909 A | 7/2019 | | |
| WO | WO 99/29726 A1 | 6/1999 | | |
| WO | WO 2015/087334 A1 | 6/2015 | | |
| WO | WO-2018106062 A1 | * | 6/2018 | ............... A61P 1/04 |
| WO | WO 2018/171406 A1 | 9/2018 | | |
| WO | WO 2018/209127 A1 | 11/2018 | | |

OTHER PUBLICATIONS

Karsdal, 2014, Brit. J. Clin. Pharm. vol. 79: 720-732.*
Rokutanda, 2015, Open Access Rheum. vol. 7: 1-8.*
Accession P014001, 2017.*
Quinn, 2001, Best. Pract. Res. Clin. Rheum. vol. 15: 49-66.*
Jian, Zhu, et al., "Induction of Arthritis in SOD Mice by Transferred Aggrecan G1-Specific Human T Cells from Rheumatoid Arthritis Patients", Medical Journal of Chinese People's Liberation Army, vol. 31, Issue 8, Aug. 2006, (3 Pages in Chinese, 5 Pages in English).
Zhu, Qi, et al., "Cobrotoxin Extracted from *Naja atra* venom relieves arthritis symptoms through anti-inflammation and immunosuppression effects in rat arthritis model", Journal of Ethnopharmacology, Nov. 2016, (9 Pages in English).
NCBI, UniProtKB,Swiss-Prot No. P01400.1.
Wang, Shu-Zhi et al. "Anti-inflammatory and immune regulatory actions of Naja naja atra venom." *Toxins* 10.3 (Feb. 28, 2018): pp. 1-14.

* cited by examiner

*Primary Examiner* — Amy E Juedes
(74) *Attorney, Agent, or Firm* — NSIP Law

(57) ABSTRACT

The present invention relates to a composition for preventing or treating Behcet's disease and rheumatoid arthritis, the composition containing a peptide or a mixture thereof as an active ingredient. More specifically, an intraperitoneal injection or application of P1 to P5 peptides or a mixture thereof as a skin external preparation to a mouse animal model having Behcet's disease caused by autoimmune response was found to ameliorate skin ulcers and skin inflammation in the Behcet's disease mouse model, and an arthritis amelioration effect on a rheumatoid arthritis animal model was also observed. Accordingly, the composition containing P1 to P5 peptides or mixtures thereof as active ingredients can be provided as medicine for Behcet's disease and rheumatoid arthritis.

4 Claims, 5 Drawing Sheets

Specification includes a Sequence Listing.

PHARMACEUTICAL COMPOSITION FOR PREVENTING OR TREATING BEHCET'S DISEASE AND RHEUMATOID ARTHRITIS, CONTAINING PEPTIDE OR MIXTURE THEREOF AS ACTIVE INGREDIENT

CROSS REFERENCE TO RELATED APPLICATIONS

This application is a U.S. National Stage Application of International Application No. PCT/KR2020/017627, filed on Dec. 4, 2020, which claims the benefit under 35 USC 119 (a) and 365 (b) of Korean Patent Application No. 10-2019-0160690 filed on Dec. 5, 2019, Korean Patent Application No. 10-2019-0160691 filed on Dec. 5, 2019, and Korean Patent Application No. 10-2020-0160760 filed on Nov. 26, 2020, in the Korean Intellectual Property Office, the entire disclosures of which are incorporated herein by reference for all purposes.

TECHNICAL FIELD

The present disclosure relates to a composition comprising peptides or a compound thereof as an active ingredient, and a medical use thereof.

BACKGROUND ART

Human immune system plays a role in protecting the body from foreign antigens invading the human body, without attacking its own tissues owing to self-tolerance. However, a case called autoimmunity occurs when self-tolerance of the immune system breaks down so that immune cells produce antibodies recognizing proteins that are normally expressed by own genes as a target to attack or destroy normal tissues by causing T-cell response. When specific symptoms appear, it is called an autoimmune disease.

Rheumatoid arthritis is a chronic disease caused by inflamed synovial membranes surrounding the joint, accompanying destructed joint and disorder as the inflammation spread to the surrounding cartilage and bones. Inflammation occurs in the synovial membrane in the joint, and immune cells in the blood gather, resulting in an increase in the volume of joint fluid and swelling of the joint to cause pain. Such rheumatoid arthritis is a disease mainly caused by an abnormal autoimmune response, and an abnormal immune function causes inflammation. The inflammatory response in the joint is mainly involved with T cells, B cells, and macrophages, and TNF-α secreted from the cells, M1 macrophages secreting IL-1β, and Th17 cells secreting IL-17 are known to exacerbate rheumatoid arthritis.

Currently, TNF inhibitors (Infliximab, Etanercept, etc.), IL-1 inhibitors (Anakinra, Canakinumab), steroids, non-steroidal anti-inflammatory drugs (NSAIDs), cytokine inhibitors (Actemra), signaling transduction inhibitors (JAK3 inhibitors), or TNF-α-related antibody treatments are mainly used for the treatment of autoimmune diseases including rheumatoid arthritis. However, these treatments cause side effects such as itchiness and respiratory infections and can hardly be a fundamental treatment method since they focus on reducing pain through suppression of inflammation.

Meanwhile, Behcet's disease is a rare, intractable inflammatory disease with repetitive aphthous ulcers, uveitis, skin inflammation, and ulcerous symptoms in the oral and genital organs. Clinical symptoms include not only skin ulcers, but also symptoms related to joints, central nervous system, stomach, kidneys, genitourinary system, lungs, cardiovascular system, digestive system such as intestinal bleeding and intestinal perforation as well as severe chronic inflammation with symptoms such as superior vena cava syndrome and aortic regurgitation in a multifaceted manner. These symptoms are associated with systemic vasculitis, which is a central pathophysiological feature of Behcet's disease.

Although the exact cause of Behcet's disease is unclear, autoimmune and autoinflammatory responses are main causes. According to research, it is reported that interleukin-17, a cytokine, is involved in development of inflammatory symptoms as it is highly expressed in the plasma of patients with Behcet's disease. Currently, new biologic drugs such as TNF-α antibodies are used as a treatment for Behcet's disease. However, they are expensive, side effects such as tuberculosis infection have been reported, and repeated use thereof may reduce the therapeutic effect due to resistance.

DISCLOSURE

Technical Goals

An object of the present disclosure is to provide a composition comprising peptides or a mixture thereof as an active ingredient, as a composition for preventing or treating Behcet's disease or rheumatoid arthritis induced by an autoimmune response.

Technical Solutions

Example embodiments of the present disclosure provide a pharmaceutical composition for preventing or treating Behcet's disease, comprising a peptide comprising an amino acid sequence represented by SEQ ID NO: 1, a peptide comprising an amino acid sequence represented by SEQ ID NO: 2, a peptide comprising an amino acid represented by SEQ ID NO: 3, a peptide comprising an amino acid represented by SEQ ID NO: 4, a peptide comprising an amino acid represented by SEQ ID NO: 5, or a mixture thereof as an active ingredient.

Example embodiments of the present disclosure provide a health food for preventing or ameliorating Behcet's disease, comprising a peptide comprising an amino acid sequence represented by SEQ ID NO: 1, a peptide comprising an amino acid sequence represented by SEQ ID NO: 2, a peptide comprising an amino acid represented by SEQ ID NO: 3, a peptide comprising an amino acid represented by SEQ ID NO: 4, a peptide comprising an amino acid represented by SEQ ID NO: 5, or a mixture thereof as an active ingredient.

Example embodiments of the present disclosure provide a pharmaceutical composition for preventing or treating rheumatoid arthritis, comprising a peptide comprising an amino acid sequence represented by SEQ ID NO: 1, a peptide comprising an amino acid sequence represented by SEQ ID NO: 2, a peptide comprising an amino acid represented by SEQ ID NO: 3, a peptide comprising an amino acid represented by SEQ ID NO: 4, a peptide comprising an amino acid represented by SEQ ID NO: 5, or a mixture thereof as an active ingredient.

Example embodiments of the present disclosure provide a health food for preventing or ameliorating rheumatoid arthritis, comprising a peptide comprising an amino acid sequence represented by SEQ ID NO: 1, a peptide comprising an amino acid sequence represented by SEQ ID NO: 2, a peptide comprising an amino acid represented by SEQ ID NO: 3, a peptide comprising an amino acid represented by SEQ ID NO: 4, a peptide comprising an amino acid represented by SEQ ID NO: 5, or a mixture thereof as an active ingredient.

Advantageous Effects

According to example embodiments of the present disclosure, the peptides of SEQ ID NOs: 1 to 5 or a mixture thereof were intraperitoneally administered or applied in the form of external skin preparations to a mouse animal model with Behcet's disease or rheumatoid arthritis induced by an autoimmune response. As a result, it was found that skin ulcers and skin inflammation were alleviated in the mouse model with Behcet's disease, and a therapeutic effect for arthritis was observed in the animal model with rheumatoid arthritis. Thus, it is possible to provide a composition comprising the peptides of SEQ ID NOs: 1 to 5 or a mixture thereof as an active ingredient as a therapeutic agent for Behcet's disease or rheumatoid arthritis.

BRIEF DESCRIPTIONS OF THE DRAWINGS

FIG. 1 shows results of identifying an effect on skin ulcer and skin inflammation after administration of each peptide or a mixture of peptides in the form of an external skin preparation (SKIN) once a day for 10 consecutive days or intraperitoneal administration (IP) once a day for 10 consecutive days to a mouse animal model with Behcet's disease, wherein (A) shows results of observing a mixture of P1, P2, P3, and P4 (P1234) 5 and 10 days after initial administration, (B) shows results of observing a mixture of P1, P2, and P4 (P124) 2 and 4 weeks after administration, and (C) shows results of observing P5 5 and 10 days after administration.

Figure 4:
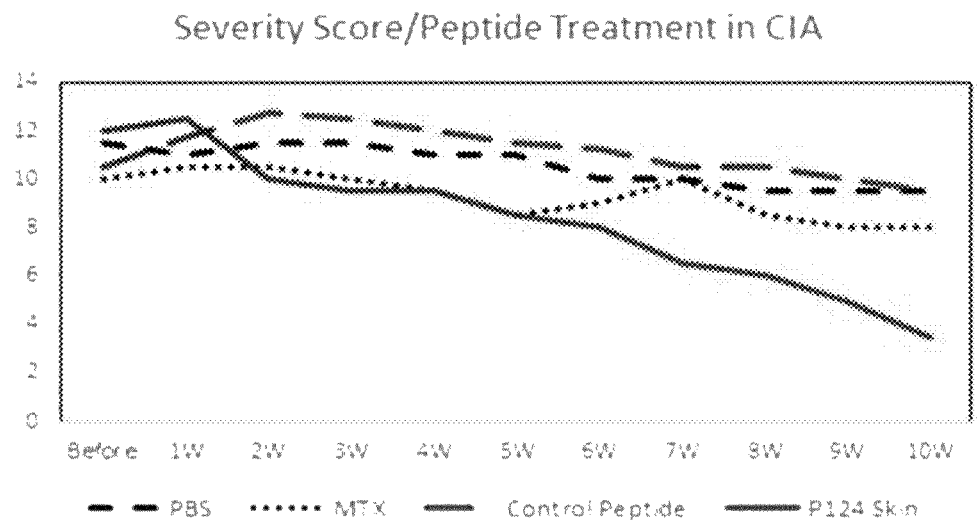

FIG. 4 shows a result of checking the change in the severity of arthritis in a mouse model with collagen-induced arthritis, specifically, a result of checking the change in the severity of arthritis for 10 weeks after treatment of a PBS control, MTX (Methotrexate, 1 µg/mouse) which is an arthritis treatment, a control peptide, and a peptide mixture (P124, 3 µg/mouse) for 10 days in the form of external skin preparation.

Figure 5:
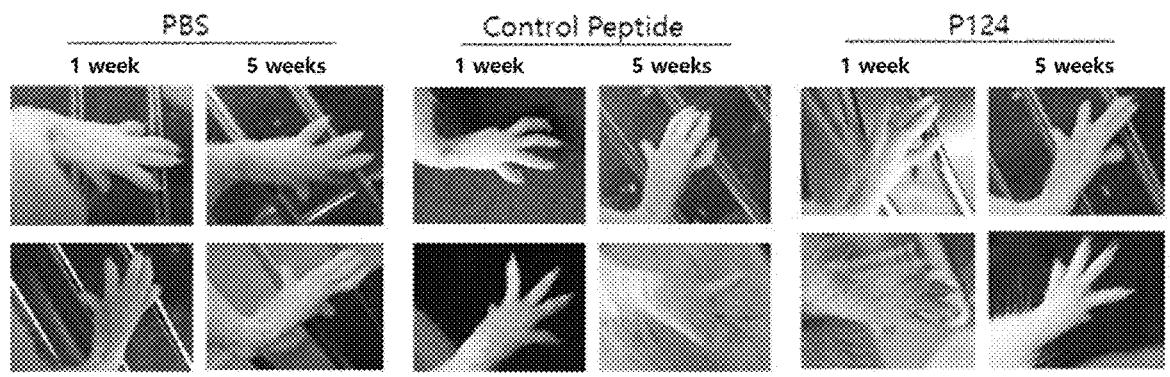

FIG. 5 shows results of checking the change in severity of arthritis after treatment of a peptide mixture in the form of external skin preparation to a mouse model with collagen-induced arthritis, specifically, results of checking change after 1 week and 5 weeks after continuous treatment of a peptide (P124, 3 µg/mouse) in the form of external skin preparation once a day for 10 days.

Figure 6:
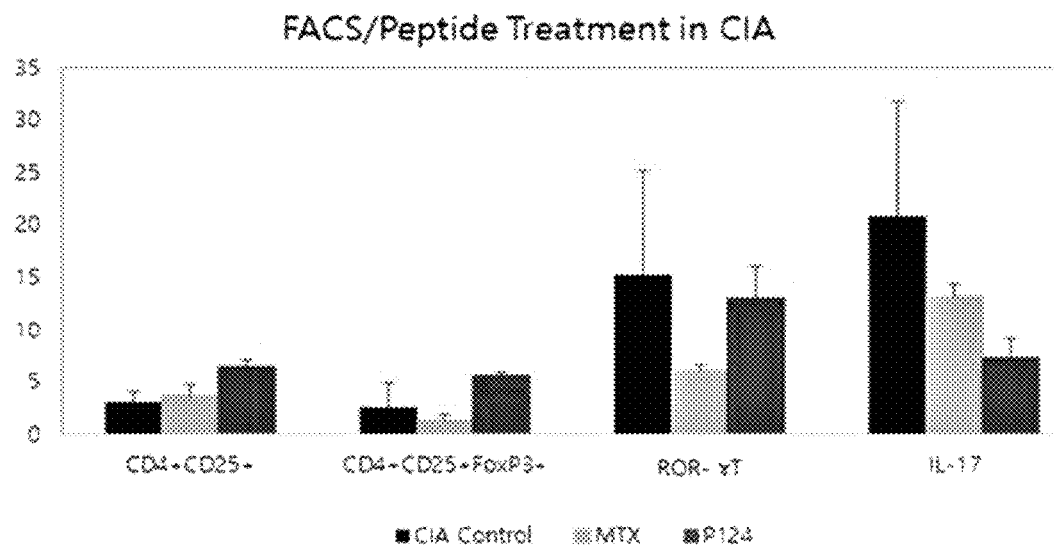

FIG. 6 shows a result of identifying the frequency of CD4+CD25+ cells, CD4+CD25+FoxP3+ cells, and IL-17+ cells after treatment of a control peptide (3 µg/mouse), MTX (1 µg/mouse), and a peptide mixture (P124, 3 µg/mouse), respectively, to a mouse model with collagen-induced arthritis.

Figure 7:
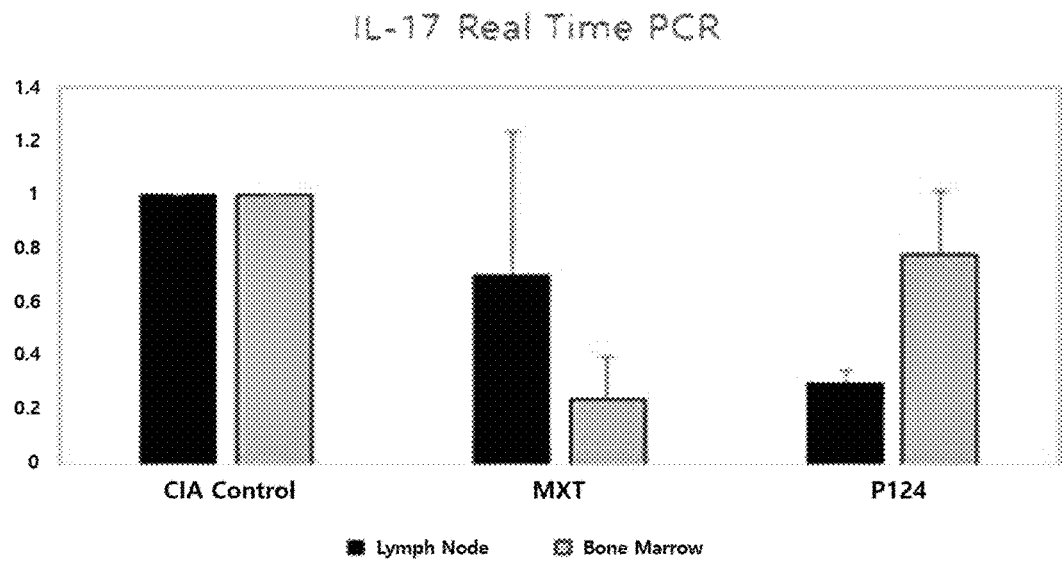

FIG. 7 shows a result of real-time PCR analysis identifying IL-17 mRNA level in lymph node cells and bone marrow of a mouse model with arthritis treated with a control peptide, MTX (1 µg/mouse), and a peptide mixture (P124, 3 µg/mouse).

Figure 8:
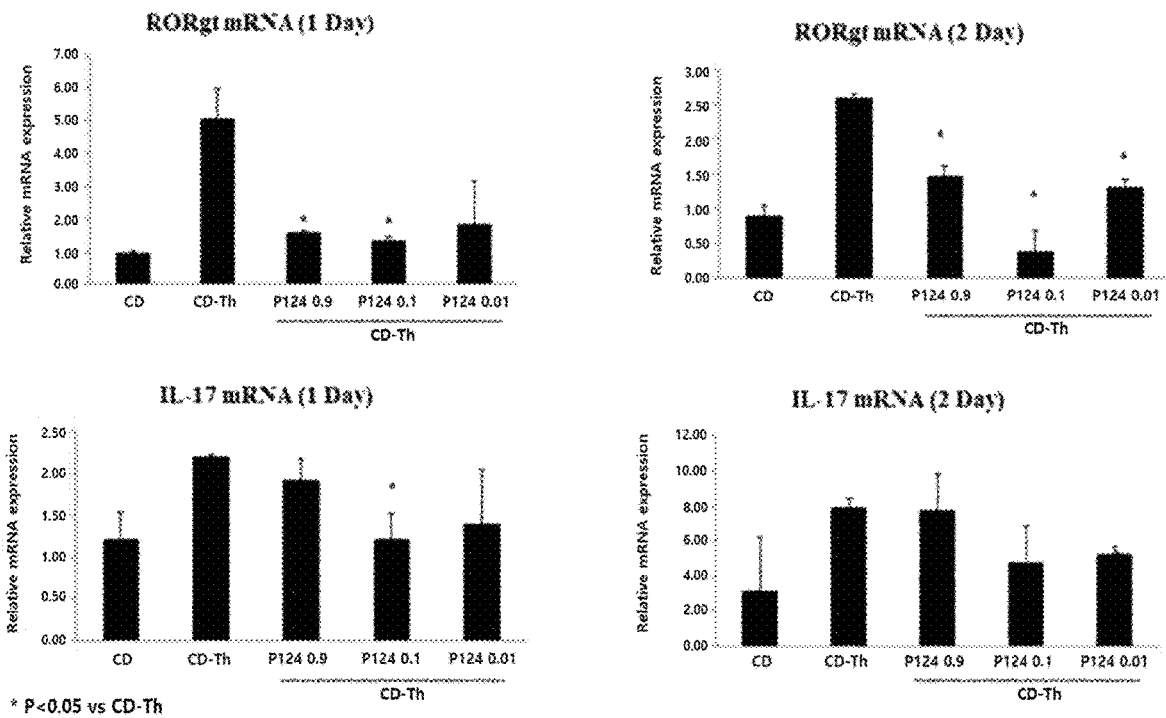

FIG. 8 shows results of real-time PCR analysis identifying ROR gammaT and IL-17 mRNA levels in each experimental group by dividing into a group (CD) of spleen cells isolated from normal mice and treated with anti-CD3 antibody and anti-CD28 antibody, a group (CD-Th) of CD treated with cytokines IL-23, IL-6, and TGFb that stimulate Th17 cell amplification, and a group of CD-Th treated with a peptide mixture (P124 0.9 µg, P124 0.1 µg, and P124 0.01 µg).

Figure 9:
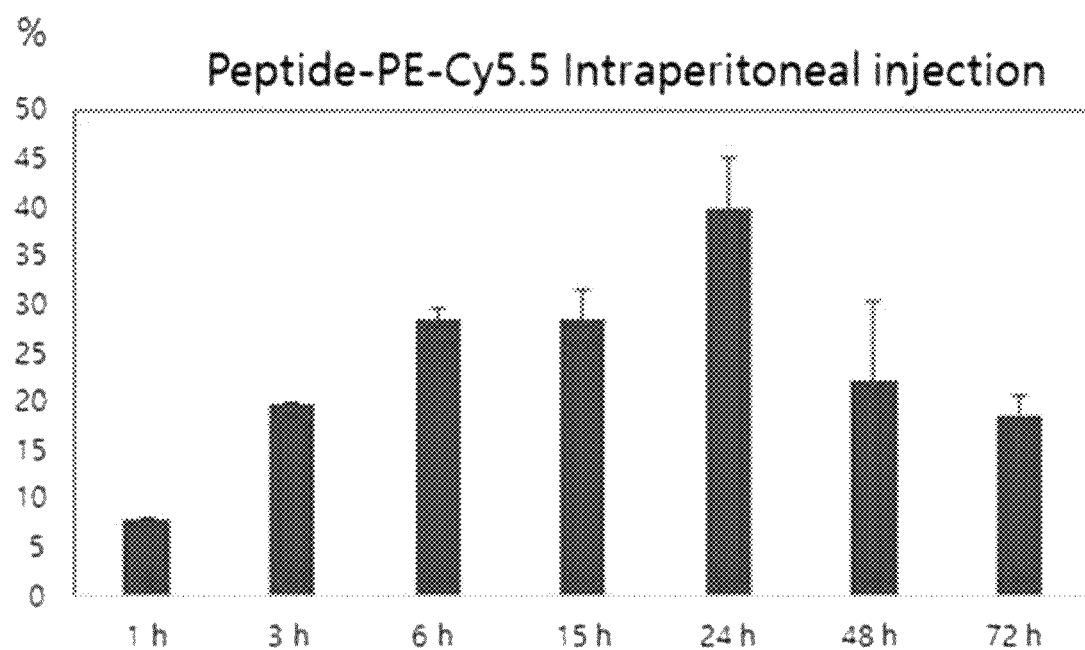

FIG. 9 shows a result of checking the retention time of the peptide in vivo.

Figure 10:
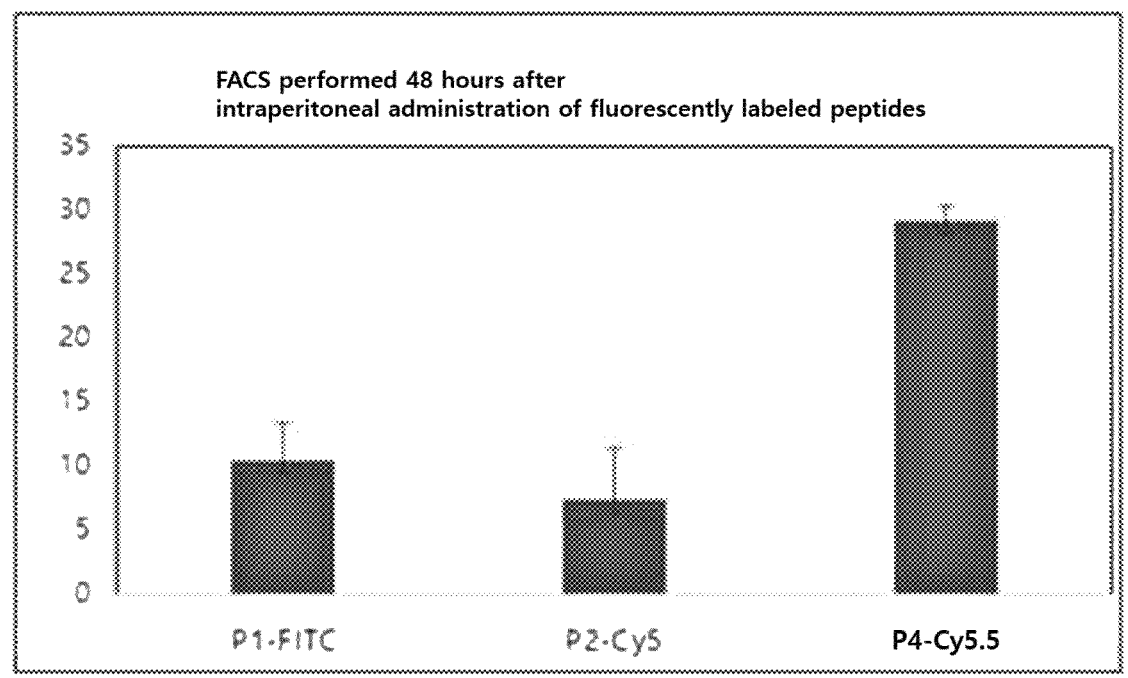

FIG. 10 is a result of identifying the biostability of the peptide.

BEST MODE

Hereinafter, an example embodiment of the present disclosure will be described in more detail.

An example embodiment of the present disclosure may provide a pharmaceutical composition for preventing or treating Behcet's disease, comprising a peptide comprising an amino acid sequence represented by SEQ ID NO: 1, a peptide comprising an amino acid sequence represented by SEQ ID NO: 2, a peptide comprising an amino acid represented by SEQ ID NO: 3, a peptide comprising an amino acid represented by SEQ ID NO: 4, and a peptide comprising an amino acid represented by SEQ ID NO: 5, or a mixture thereof as an active ingredient.

The pharmaceutical composition may be a formulation selected from the group consisting of oral preparations, external preparations, suppositories, and injections, but is not limited thereto.

An example embodiment of the present disclosure may provide a health food for preventing or ameliorating Behcet's disease, comprising a peptide comprising the amino acid sequence represented by SEQ ID NO: 1, a peptide comprising the amino acid sequence represented by SEQ ID NO: 2, a peptide comprising the amino acid represented by SEQ ID NO: 3, a peptide comprising the amino acid represented by SEQ ID NO: 4, and a peptide comprising the amino acid represented by SEQ ID NO: 5, or a mixture thereof as an active ingredient.

In addition, an example embodiment of the present disclosure may provide a pharmaceutical composition for preventing or treating rheumatoid arthritis, comprising a peptide comprising the amino acid sequence represented by SEQ ID NO: 1, a peptide comprising the amino acid sequence represented by SEQ ID NO: 2, a peptide comprising the amino acid represented by SEQ ID NO: 3, a peptide comprising the amino acid represented by SEQ ID NO: 4, and a peptide comprising the amino acid represented by SEQ ID NO: 5, or a mixture thereof as an active ingredient.

The pharmaceutical composition may be a formulation selected from the group consisting of oral preparations, external preparations, suppositories, and injections, but is not limited thereto.

An example embodiment of the present disclosure may provide a health food for preventing or ameliorating rheumatoid arthritis, comprising a peptide comprising the amino acid sequence represented by SEQ ID NO: 1, a peptide comprising the amino acid sequence represented by SEQ ID NO: 2, a peptide comprising the amino acid represented by SEQ ID NO: 3, a peptide comprising the amino acid represented by SEQ ID NO: 4, and a peptide comprising the amino acid represented by SEQ ID NO: 5, or a mixture thereof as an active ingredient.

In an example embodiment of the present disclosure, the pharmaceutical composition may further include one or more additives selected from the group consisting of carriers, excipients, disintegrants, sweeteners, coating agents, swelling agents, glydents, flavoring agents, antioxidants, buffers, bacteriostatic agents, diluents, dispersants, surfactants, binders, and lubricants appropriate to be commonly used in the preparation for pharmaceutical compositions.

Specifically, lactose, dextrose, sucrose, sorbitol, mannitol, xylitol, erythritol, maltitol, starch, gum acacia, alginate, gelatin, calcium phosphate, calcium silicate, cellulose, methyl cellulose, microcrystalline cellulose, polyvinyl pyrrolidone, water, methylhydroxybenzoate, propylhydroxybenzoate, talc, magnesium stearate, and mineral oil may be used as the carriers, excipients and diluents. Solid preparations for oral administration may include tablets, pills, powder, granules and capsules, wherein such solid preparation may be prepared by mixing at least one excipient in the composition, for example, starch, calcium carbonate, sucrose or lactose, and gelatin. In addition, lubricants such as magnesium stearate and talc may be used in addition to simple excipients. A liquid formulation for oral administration may include suspensions, solutions, emulsions, and syrups, and various excipients such as wetting agents, sweeteners, fragrances, and preservatives may be included in addition to water and liquid paraffin, which are commonly used simple diluents. The formulation for parenteral administration may include sterile aqueous solutions, non-aqueous solvents, suspensions, emulsions, freeze-dried formulations, and suppositories. Propylene glycol, polyethylene glycol, vegetable oils such as olive oil, and injectable esters such as ethyl oleate may be used as the non-aqueous solvents and suspensions. Witepsol, macrogol, Tween 61, cacao butter, laurin fat, and glycerogelatin may be used as a base of the suppositories.

According to an example embodiment of the present disclosure, the pharmaceutical composition may be administered to a subject in a conventional manner via intravenous, intraarterial, intraperitoneal, intramuscular, intrasternal, transdermal, intranasal, inhalational, topical, rectal, oral, intraocular, or intradermal routes.

In an example embodiment of the present disclosure, the 'subject' may be a mammal including a human, but is not limited to the examples.

In addition, the health food may be used together with other food or food additives in addition to the peptides or a mixture thereof, and may be appropriately used according to a conventional method. The mixing amount of the active ingredient may be appropriately determined depending on the intended use thereof, for example, prevention, health or therapeutic treatment.

The type of health food is not particularly limited, and examples include meat, sausage, bread, chocolate, candy, snacks, confectionery, pizza, ramen, other noodles, gum, dairy products including ice cream, various soups, beverages, tea, drinks, alcoholic beverages, and vitamin complexes.

MODES FOR CARRYING OUT INVENTION

Hereinafter, examples will be described in detail to help the understanding of the present disclosure. However, the following examples are merely illustrative of the content of the present disclosure, and the scope of the present disclosure is not limited to the following examples. The examples of the present disclosure are provided to more completely explain the present disclosure to those skilled in the art.

Experimental Example

The following experimental examples are intended to provide experimental examples commonly applied to each example embodiment according to an example embodiment of present disclosure.

1. Experimental Animal

Male ICR mice (4-5 weeks of age) were infected with HSV type 1 ($1 \times 10^6$, 20 µL) grown in Vero cells as previously reported (S. Sohn et al., Eur J Dermatol, 8 (1): 21-23, 1998). 10 days after the first virus inoculation, the mice were infected twice by inoculating the virus again and monitored for 32 weeks. Animals were treated according to the guidelines provided by Institutional Animal Care and Use Committee (IACUC) of School of Medicine at Ajou University. The study protocol was approved by IACUC (Approval No.: AMC-2016-0010).

2. Mouse Model with Behcet's Disease (BD)

15% of HSV-infected mice showed symptoms similar to BD. Symptoms include skin ulcers, skin pustule, genital ulcers, erythema, mouth ulcers, ear inflammation, arthritis, red eyes (left and right), decreased visual acuity (left and right), weight loss, and facial swelling. Mouth ulcers, genital ulcers, skin ulcers, and eye symptoms were classified as major symptoms while the other symptoms were mild.

Mice showing one or more major symptoms with one mild symptom were considered as BD mice, the score for each symptom was calculated as 1, and the sum of the scores was used to determine the severity of BD. When symptoms disappeared or the size of the lesion was reduced by 20% or more, it was classified as symptom improved state. The disease severity score for BD was calculated based on the BD Activity Index as described in the BD Activity Form (www.behcet.ws/pdf/BehcetsDiseaseActivityForm.pdf).

3. Flow Cytometry

After isolation of peripheral blood cells in the mice, red blood cells were removed. Cells were reacted with fluorescently labeled anti-CCR1 antibodies and then analyzed by flow cytometry to measure the frequency of CCR1-expressing cells in each mouse. After isolation of cells from the lymph nodes in the mice, the cells were reacted with antibodies in the same way to be analyzed.

<Example 1> Preparation of Peptides

With efforts to develop a low-molecular substance for the treatment of Behcet's disease or rheumatoid arthritis from snake venom, particularly a substance known as a protein, peptides with medicinal effects have been discovered. Peptides having the following 11 to 23 amino acid sequences were prepared.

P1: LICPEKYCNKVHT (SEQ ID NO: 1)
P2: YCNKVHTCRNG (SEQ ID NO: 2)
P3: PREIVECCSTDKCNH (SEQ ID NO: 3)
P4: HTCRNGENICF (SEQ ID NO: 4)
P5: ENICFKRFYEGNLLGKRYPRGCA (SEQ ID NO: 5)

<Example 2> Identification of Therapeutic Effect of Peptides on Behcet's Disease The P1, P2, P3, P4, P5 peptides or an appropriate mixture prepared in Example 1 were mixed with physiological saline for injection and injected into the abdominal cavity of mice with inflammatory disease or treated in the form of an external skin preparation in the previously prepared mouse animal model with Behcet's disease. The improvement of symptoms was visually checked after 5 days and 10 days, or at 2 weeks and 4 weeks, which is shown in FIG. 1.

Figure 1:
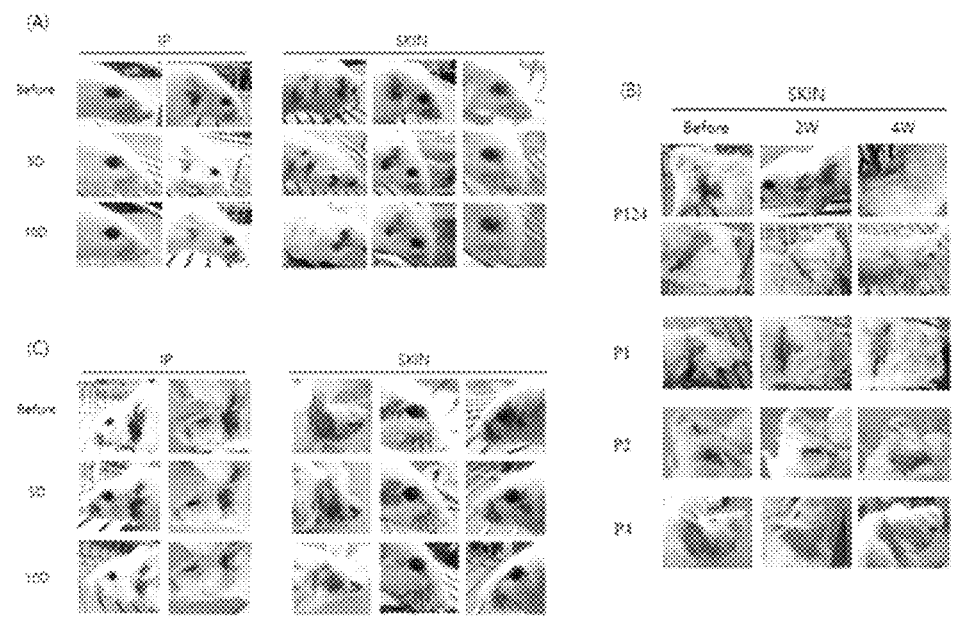

As shown in FIG. 1, it was found that skin ulcers and skin inflammation were alleviated in the mouse model with Behcet's disease administered with P1, P2, P4 and P5 peptides, respectively. Also, skin ulcers and skin inflammation were effectively alleviated in the mouse model with Behcet's disease intraperitoneally injected with each peptide mixture.

Figure 2:
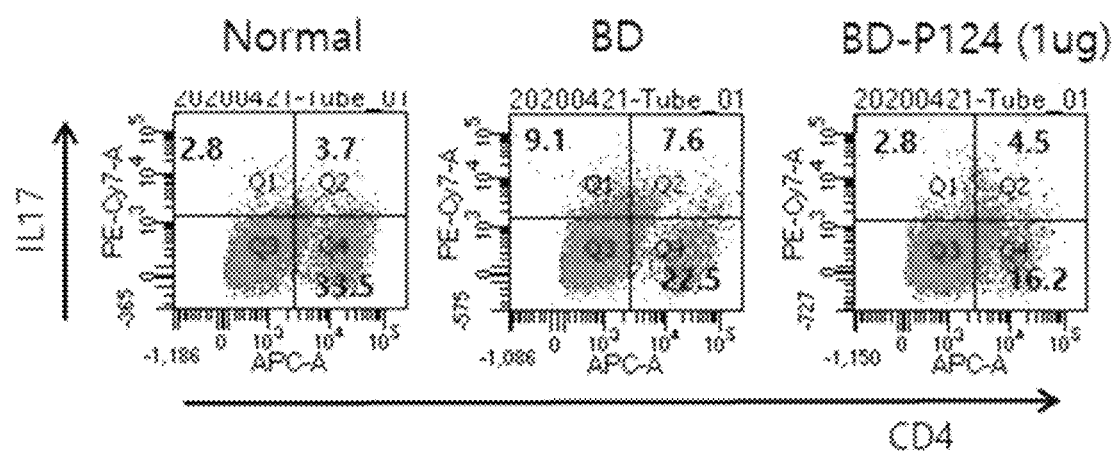
FIG. 2 shows results of FACS analysis identifying the frequency of CD4+IL-17+ cells after treatment of a peptide mixture (P124) to cells isolated from the spleen of a mouse animal model with Behcet's disease.

In addition, after treating 1 µg of a mixture of P1, P2 and P4 peptides while culturing cells isolated from the spleen of a mouse with Behcet's disease, flow cytometry (FACS) was performed, and the results were shown in FIG. 2.

the arthritis treatment effect was checked after 5 weeks, and the results were shown in FIG. 5.

As shown in FIG. 5, it was found that the group treated with the peptide mixture (P124) of the present disclosure had an excellent arthritis treatment effect.

After isolation of cells from the mouse model with arthritis treated with the peptide mixture (P124) of the present disclosure, flow cytometry (FACS) was performed, and the results were shown in FIG. 6 and Table 1 below.

As shown in FIG. 6 and Table 1, compared with the control group or the methotrexate (MTX)-treated group, it was found that the frequency of CD4+CD25+ cells and CD4+CD25+FoxP3+ cells increased in the peptide mixture (P124)-treated group, and the frequency of IL-17+ cells decreased.

TABLE 1

|  | CD4 + CD25+ | CD4 + CD25 + FoxP3+ | ROR-gammaT | IL-17 |
|---|---|---|---|---|
| CIA Control | 3.1 ± 0.98 | 2.5 ± 2.5 | 15.2 ± 10.04 | 20.9 ± 10.88 |
| Methotrexate | 3.7 ± 1.13 | 1.45 ± 0.49 | 6.2 ± 0.42 | 13.15 ± 1.34 |
| P124 | 6.45 ± 0.63 | 5.65 ± 0.35 | 13.1 ± 3.04 | 7.3 ± 1.83 |

As shown in FIG. 2, it was found that the frequency of CD4+IL-17+ cells decreased in the peptide-treated group.

Figure 3:
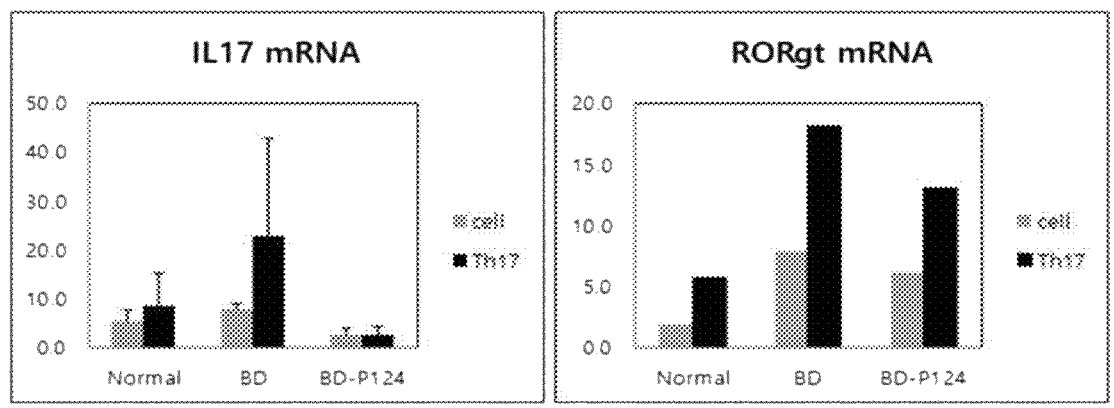
FIG. 3 shows results of a real-time PCR analysis identifying IL-17 and ROR gammaT mRNA levels after treatment of a peptide mixture (P124) to cells isolated from the spleen of a mouse animal model with Behcet's disease.

In addition, real-time PCR was performed to compare IL-17 and ROR gammaT mRNA levels in splenocytes of mice with Behcet's disease cultured by treating the mixture of P1, P2 and P4 peptides in the same manner, and the results were shown in FIG. 3. As shown in FIG. 3, it was found that the expression of IL-17 and ROR gammaT decreased in the peptide-treated group.

<Example 3> Identification of Therapeutic Effect of Peptides on Rheumatoid Arthritis To prepare a mouse model with rheumatoid arthritis, subcutaneous injection (first immunization) was performed on the tail of a group of 8-week-old male ICR normal mice (average weight: 20 g) injected with 50 µg of a mixture obtained by mixing type II collagen with Complete Freund's adjuvant (CFA) and paraffin oil in the same amount. Two weeks later, the same substance was subcutaneously injected into the tail in the same manner to prepare an animal model with rheumatoid arthritis.

In the same manner as in Example 2, the mixture of P1, P2 and P4 peptides (P124) prepared in Example 1 was administered to the skin of mice as an external skin preparation. In addition, as a control, PBS and MTX were administered in the same manner, and the results were shown in FIG. 4.

As shown in FIG. 4, it was observed that the severity score was reduced in the group administered with the peptide mixture in the present disclosure as compared to the PBS control group, confirming that the group administered with the peptide mixture exhibited excellent effects. In addition, the reduction in the severity score for arthritis was also shown in the group administered with MTX, an arthritis treatment, but it was found that the effect decreased after 7 weeks.

From the above results, it was determined that the mixture of peptides (P124) of the present disclosure exhibits an excellent effect in reducing the severity compared to MTX.

In addition, the peptide mixture (P124) was treated as an external skin preparation once a day for 10 consecutive days, In addition, real-time PCR was performed with lymph nodes and bone marrow of a mouse model with arthritis treated with the peptide mixture (P124) of the present disclosure to check the IL-17 level, and the results were shown in FIG. 7.

As shown in FIG. 7, it was found that the IL-17 expression level in the lymph node cells of the peptide mixture (P124)-treated group decreased compared to the control group.

Meanwhile, after division into a group (CD) of splenocytes isolated from normal mice and treated with anti-CD3 antibody and anti-CD28 antibody, a group (CD-Th) added with cytokines IL-23, IL-6, TGFb that stimulate Th17 cell amplification along with anti-CD3 antibody and anti-CD28 antibody, and a group treated with the mixture of P1, P2 and P4 peptides (0.9 µg, 0.1 µg, and 0.01 µg) in addition to CD-Th, culture was performed. Thereafter, real-time PCR was performed to check RORgt and IL-17 mRNA levels, and the results were shown in FIG. 8.

As shown in FIG. 8, it was found that expression of ROR gammaT and IL-17 decreased in the peptide-treated group.

<Example 4> Identification of Stability of Peptide

After intraperitoneal injection of the fluorescently labeled peptide P4 into mice, intraperitoneal macrophages were isolated, and the frequency of fluorescently labeled macrophages was analyzed by FACS to measure the retention time of the peptides in the abdominal cavity, which was shown in FIG. 9.

As shown in FIG. 9, it was found that the frequency of cells including the peptide was the highest at 24 hours and maintained up to 72 hours.

In addition, the P1, P2, and P4 peptides were labeled with each different fluorescence, and the three types were mixed and administered to normal mice. After 48 hours, the intraperitoneal macrophages were isolated to be analyzed by FACS, and the results were shown in FIG. 10.

As shown in FIG. 10, it was found that all three types of peptides remained in the abdominal cavity after 48 hours.

From the above results, it was found that the P1, P2 and P4 peptides were stably maintained in vivo.

Although specific parts of the present disclosure have been described in detail above, it is clear for those skilled in the art that these specific descriptions are merely preferred example embodiments and the scope of the present disclosure is not limited thereto. Accordingly, the substantial scope of the present disclosure may be defined by the appended claims and equivalents thereof.

---

What is claimed is:

1. A method of treating Behcet's disease, comprising administering a pharmaceutical composition comprising an active ingredient selected from the group consisting of a peptide consisting of an amino acid sequence represented by SEQ ID NO: 1, a peptide consisting of an amino acid sequence represented by SEQ ID NO: 2, a peptide consisting of an amino acid sequence represented by SEQ ID NO: 3, a peptide consisting of an amino acid sequence represented by SEQ ID NO: 4, and a peptide consisting of an amino acid sequence represented by SEQ ID NO: 5 to a subject in need of treatment for Behcet's disease.

2. The method of claim 1, wherein the pharmaceutical composition is a formulation selected from the group consisting of external preparations, suppositories, and injections.

3. A method of treating rheumatoid arthritis, comprising administering a pharmaceutical composition comprising an active ingredient selected from the group consisting of a peptide consisting of an amino acid sequence represented by SEQ ID NO: 1, a peptide consisting of an amino acid sequence represented by SEQ ID NO: 2, a peptide consisting of an amino acid sequence represented by SEQ ID NO: 3, a peptide consisting of an amino acid sequence represented by SEQ ID NO: 4, and a peptide consisting of an amino acid sequence represented by SEQ ID NO: 5 to a subject in need of treatment for rheumatoid arthritis.

4. The method of claim 3, wherein the pharmaceutical composition is a formulation selected from the group consisting of external preparations, suppositories, and injections.

* * * * *

SEQUENCE LISTING

<160> NUMBER OF SEQ ID NOS: 5

<210> SEQ ID NO 1
<211> LENGTH: 13
<212> TYPE: PRT
<213> ORGANISM: Unknown
<220> FEATURE:
<223> OTHER INFORMATION: 3-finger toxin

<400> SEQUENCE: 1

Leu Ile Cys Pro Glu Lys Tyr Cys Asn Lys Val His Thr
1               5                   10

<210> SEQ ID NO 2
<211> LENGTH: 11
<212> TYPE: PRT
<213> ORGANISM: Unknown
<220> FEATURE:
<223> OTHER INFORMATION: 3-finger toxin

<400> SEQUENCE: 2

Tyr Cys Asn Lys Val His Thr Cys Arg Asn Gly
1               5                   10

<210> SEQ ID NO 3
<211> LENGTH: 15
<212> TYPE: PRT
<213> ORGANISM: Unknown
<220> FEATURE:
<223> OTHER INFORMATION: 3-finger toxin

<400> SEQUENCE: 3

Pro Arg Glu Ile Val Glu Cys Cys Ser Thr Asp Lys Cys Asn His
1               5                   10                  15

<210> SEQ ID NO 4
<211> LENGTH: 11
<212> TYPE: PRT
<213> ORGANISM: Unknown
<220> FEATURE:
<223> OTHER INFORMATION: 3-finger toxin

<400> SEQUENCE: 4

His Thr Cys Arg Asn Gly Glu Asn Ile Cys Phe
1               5                   10

<210> SEQ ID NO 5
<211> LENGTH: 23
<212> TYPE: PRT
<213> ORGANISM: Unknown
<220> FEATURE:
<223> OTHER INFORMATION: 3-finger toxin

<400> SEQUENCE: 5

Glu Asn Ile Cys Phe Lys Arg Phe Tyr Glu Gly Asn Leu Leu Gly Lys
1               5                   10                  15

Arg Tyr Pro Arg Gly Cys Ala
            20